United States Patent
Delaunay

(10) Patent No.: US 12,365,127 B2
(45) Date of Patent: Jul. 22, 2025

(54) METHOD FOR REGULATING THE CYCLIC PRODUCTION OF CONTAINERS BY STRETCH-BLOWING

(71) Applicant: SIDEL PARTICIPATIONS, Octeville-sur-Mer (FR)

(72) Inventor: Arnaud Delaunay, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 559 days.

(21) Appl. No.: 17/604,402

(22) PCT Filed: Mar. 30, 2020

(86) PCT No.: PCT/EP2020/058925
§ 371 (c)(1),
(2) Date: Oct. 16, 2021

(87) PCT Pub. No.: WO2020/212124
PCT Pub. Date: Oct. 22, 2020

(65) Prior Publication Data
US 2022/0212392 A1    Jul. 7, 2022

(30) Foreign Application Priority Data
Apr. 17, 2019 (FR) .................................... 1904109

(51) Int. Cl.
*B29C 49/78* (2006.01)
*B29C 49/08* (2006.01)
(Continued)

(52) U.S. Cl.
CPC ............ *B29C 49/783* (2013.01); *B29C 49/08* (2013.01); *B29C 49/28* (2013.01); *B29C 49/78* (2013.01);
(Continued)

(58) Field of Classification Search
CPC ....... B29C 49/06; B29C 49/12; B29C 49/783; B29C 49/78; B29C 2049/7832;
(Continued)

(56) References Cited

U.S. PATENT DOCUMENTS 9,676,136 B2 *   6/2017   Deau ..................... B29C 49/78
9,676,158 B2 *   6/2017   Deau ..................... B29C 49/12
(Continued)

*Primary Examiner* — Darrin D Dunn
(74) *Attorney, Agent, or Firm* — Perilla Knox & Hildebrandt LLP; Stephanie Davy-Jow; Blake T. Hudson

(57) ABSTRACT

A process for regulating a cyclical production of containers by stretch blow molding from preforms, comprising an initializing phase, a regulated production phase, and a stabilizing phase. In the regulated production phase, the pre-blowing curve is measured and stored, and a real instant and/or a real pressure is calculated, corresponding to a characteristic point. A new value of at least one operating parameter of the machine is calculated as a function of a difference between a real instant and a reference instant and/or between a real pressure and a reference pressure. The regulated production phase monitors for change, imposed by the operator, of a value of an operating parameter of the machine and automatically updates the regulating parameters in the stabilizing phase while production is continued. The process also corrects the reference instant and/or the reference pressure as a function of the real pressure and/or real instant values stored.

19 Claims, 8 Drawing Sheets

(51) Int. Cl.
  *B29C 49/28*   (2006.01)
  *G05B 13/02*   (2006.01)
  *B29K 67/00*   (2006.01)
  *B29L 31/00*   (2006.01)

(52) U.S. Cl.
  CPC ...... *G05B 13/024* (2013.01); *B29K 2067/003* (2013.01); *B29L 2031/7158* (2013.01)

(58) Field of Classification Search
  CPC .. B29C 2049/78805; B29C 2049/7874; B29C 49/18; B29D 22/003; G05B 17/02; G05B 19/18; G05B 2219/2635; G05B 2219/37371; G05B 2219/45244; G05B 13/024
  See application file for complete search history.

(56) References Cited

U.S. PATENT DOCUMENTS

| | | | |
|---|---|---|---|
| 9,744,712 B2* | 8/2017 | Letestu | B29C 49/78 |
| 10,259,696 B2* | 4/2019 | Godet | G01L 3/108 |
| 10,406,741 B2* | 9/2019 | Gendre | B29C 49/783 |
| 2010/0090375 A1 | 4/2010 | Geltinger | |
| 2010/0176528 A1* | 7/2010 | Monin | B29C 49/783 |
| | | | 425/149 |
| 2010/0201013 A1* | 8/2010 | Monin | B29C 49/58 |
| | | | 425/149 |
| 2013/0187304 A1* | 7/2013 | Deau | B29C 49/12 |
| | | | 425/149 |
| 2015/0190959 A1* | 7/2015 | Deau | B29C 49/16 |
| | | | 425/149 |

* cited by examiner

METHOD FOR REGULATING THE CYCLIC PRODUCTION OF CONTAINERS BY STRETCH-BLOWING

The present invention relates to a process for regulating a cyclical production of containers by stretch blow molding from preforms made of plastic material in a machine comprising one or more stretch blow molding stations, each designed to produce a container during a production cycle, and each provided with a preblowing solenoid valve fluidically connecting the preform to a pressurized fluid source during a preblowing phase.

The cyclical production of containers by stretch blow molding typically involves heating a preform made of plastic material to the glass transition temperature of the preform, then introducing the heated preform into a mold, injecting pressurized fluid into the preform in order to shape a container in the mold, and removing the container from the mold.

The injection of pressurized fluid itself comprises multiple successive steps. A first, preblowing step involves injecting, into the preform, a fluid at reduced, preblowing pressure that is generally between 5 and 16 bar so as to form a bubble while a stretching rod stretches the preform. The stretching rod brings about mechanical stretching in a longitudinal direction of the preform while the injection of pressurized fluid brings about stretching in a transverse direction, perpendicular to the longitudinal direction. The stretching is thus bi-directional in order to ensure even distribution of the material and proper orientation of the molecular chains.

A second, blowing operation involves injecting a fluid at high pressure, generally above 25 bar, and often between 30 and 35 bar. The blowing operation serves to press the bubble formed by the preform made of plastic material against the walls of the mold, and thus form a container having a desired and well-defined shape.

The preblowing phase is crucial for the development of the plastic of the preform, and for the orientation of the molecular chains. Defective preblowing results in poor distribution of the material, and thus ultimately in weakened and hence defective containers. In the context of high-cadence industrial production, the preblowing must be controlled in order to ensure the quality of the containers formed from preforms made of plastic material. It is known from WO2013178903 to regulate the cyclical production of containers of a machine comprising stretch blow molding stations on the basis of reference points for the pressure inside the preform as a function of time, these reference points being collected during preblowing on a station referred to as a reference station. The reference points for the pressure as a function of time are used for regulating the machine, in order to modify the settings of a station whose pressure, measured at a given time, or whose time to reach a given pressure, is outside a tolerance region around the reference pressure or the reference time for that point.

It can happen that an operator imposes a change to one or more operating parameters of the machine, for example in the event of the use of new preforms that have different characteristics in terms of composition, or heating temperature prior to preblowing.

However, changing an operating parameter of the machine while production is ongoing stops regulation and means that the cyclical production of containers continues without regulation. It is then necessary to manually re-take reference points in order that regulation can resume.

This means that the preblowing phase drifts, and productivity is reduced.

There is therefore a need to improve the operation of the machine when an operator disturbs the regulation system.

To that end, the present invention relates to a process for regulating a cyclical production of containers by stretch blow molding from preforms made of plastic material in a machine comprising one or more stretch blow molding stations, each designed to produce a container during a production cycle, and each provided with a preblowing solenoid valve fluidically connecting the preform to a pressurized fluid source providing a preblowing flow rate during a preblowing phase, the regulating process comprising:

a) an initializing phase including a step of installation by an operator and of storing of a plurality of operating parameters of the machine during the production cycle, and of regulating parameters including at least one reference position (Ac, Bc, PCab, Fc) of at least one characteristic point (A, B, Pab, F) of a preblowing curve corresponding to the pressure prevailing inside the preform during at least one part of the preblowing, said reference position (Ac, Bc, PCab, Fc) being determined by a reference instant and/or a reference pressure, b) a regulated production phase during which, for each production cycle, at least one preform is stretched and blown by injection of a pressurized fluid in each station and during which:

b1) for at least one reference station of the machine, the preblowing curve including the characteristic point is measured and stored, and a real instant and/or a real pressure is calculated or determined, corresponding to said characteristic point (A, B, Pab, F) for the measured preblowing curve, and b2) a new value of at least one operating parameter of the machine is calculated and stored as a function of a difference between the real instant and the reference instant and/or between the real pressure and the reference pressure, wherein, in this regulating process, the regulated production phase includes a step b3) of monitoring a possible change, imposed by the operator, of a value of an operating parameter of the machine, the regulating process further comprising a phase of automatically updating the regulating parameter(s), which is implemented in the event of an imposed change of an operating parameter of the machine, involving:

c1) a stabilizing step during which the production is continued from the parameter imposed during a predetermined stabilizing period, and for each production cycle the actions b1) are executed, and the actions b2) are suspended, and c2) a step of correcting the reference instant and/or the reference pressure as a function of the real pressure and/or real instant values stored during the stabilizing step, in order to continue with the regulated production phase.

By virtue of the phase of automatically updating the regulating parameter(s), the process according to the invention makes it possible to continue with regulation in the event of an imposed change of an operating parameter of the machine. It is no longer necessary to manually re-take reference points.

According to other features of the process, considered in isolation or in any technically conceivable combination:

those operating parameters of the machine that can be recalculated during the step b2) are among: an instant (TRo) of commanding the opening of the preblowing solenoid valve, a value or a time profile of the preblowing flow rate, a preblowing pressure or a time profile of a travel of a stretching rod, the regulating parameters include storing at least one tolerance for accepting a real position (Ar, Br, PRab, Fr) of the at least one characteristic point (A, B, Pab, F) of the preblowing curve chosen relative to the reference position of said characteristic point (A, B, Pab, F), and in which there is no calculation of a new value for said operating parameter of the machine if said difference is smaller than the acceptance tolerance.

Thus, in the event of a small difference between the real instant and the reference instant, and/or between the real pressure and the reference pressure, the value of the operating parameter of the machine to which a change has been imposed is retained without excessively impacting the productivity of the machine.

According to other features of the process, considered in isolation or in any technically conceivable combination:

the regulating parameters comprise a reference instant (Ac) for the start of the increase in pressure inside the preform, termed start of preblowing reference instant (Ac), and a tolerance for the start of preblowing reference instant (Ac), and, if the real instant (Ar) of the start of the preblowing in the preform of the reference station is either later or earlier, by a time difference with respect to the start of preblowing reference instant (Ac) for said reference station that is greater than the acceptance tolerance, the new value calculated as the instant (TRo) of commanding the opening of the preblowing solenoid valve of each of the stretch blow molding stations is then brought forward or respectively delayed, by said time difference, in all of the stretch blow molding stations.

the regulating parameters further include:

a reference instant (Bc) of a peak in preblowing pressure in the preform, and an acceptance tolerance for the reference pressure peak instant (Bc), in which the regulated production phase b) first comprises a possible imposed change in the instant (TRo) of commanding the opening of the preblowing solenoid valve to a production cycle during which the real instant (Ar) of the start of the preblowing in the preform is smaller than the start of preblowing acceptance tolerance, a real instant (Br) of a pressure peak is calculated for the following production cycles, and if this is either earlier or later than the reference pressure peak instant (Bc), by a time difference that is greater than the acceptance tolerance, a new value is calculated for the preblowing flow rate (Dp), this being respectively reduced or increased with respect to the preblowing flow rate (Dp) during the production cycle during which the real pressure peak instant (Br) has been calculated.

the regulating parameters further include a reference gradient (PCab) of the increase in pressure between the characteristic point (A) of the start of preblowing and the characteristic point (B) of the pressure peak, and an acceptance tolerance for said reference pressure increase gradient (PCab), in which the regulated production phase first comprises the possible imposed change in the instant (TRo) of commanding the opening of the preblowing solenoid valve to a production cycle during which the real instant (Ar) of the start of the preblowing in the preform is smaller than the start of preblowing acceptance tolerance, then the possible imposed change in the preblowing flow rate (Dp) to a production cycle during which the real start of preblowing instant (Ar) and the real pressure peak instant (Br) are smaller than their respective acceptance tolerance, then a real gradient (PRab) of the increase in pressure between the real start of preblowing instant (Ar) and the real pressure peak instant (Br) is calculated for the following production cycles, and if the real gradient (PRab) differs from the reference gradient (PCab) by a difference greater than the gradient acceptance tolerance, the following are calculated:

a new value for the nominal preblowing flow rate or a new time profile for the preblowing flow rate, and/or a new value for the pressure of the pressurized fluid source, and/or a new value for the nominal speed or the stretching time profile of a stretching rod.

step b1) comprises, solely or in addition, the operations consisting in:

detecting an instant (Ar), termed real instant (Ar) of start of preblowing in the reference station or in another station, where the pressure in the preform starts to increase;

storing this instant;

calculating a real end of preblowing instant such that:

real end of preblowing instant=real start of preblowing instant+$\Delta t - \delta$, where $\Delta t$ is a predefined period of opening of the preblowing solenoid valve, $\delta$ is a predetermined constant;

deducing therefrom a real end of preblowing pressure (Fr) on the basis of pressure measurements taken in step b1);

comparing the real end of preblowing pressure (Fr) determined in this manner with a reference end of preblowing pressure (Fc) for the reference station;

if the real end of preblowing pressure (Fr) differs from the reference end of preblowing pressure (Fc) by a value greater than an acceptance tolerance, a new value is calculated for the preblowing flow rate (Dp), this being respectively reduced or increased with respect to the preblowing flow rate (Dp) during the production cycle during which the real end of preblowing pressure (Fr) has been calculated.

Thus, in the event of a possible imposed change of operating parameters of the machine such as the instant of opening the solenoid valve or the preblowing flow rate, the regulating parameters of the machine are automatically updated once it is no longer possible to remain within the acceptance tolerance, and those operating parameters of the machine to which a change has not been imposed are recalculated.

According to other features of the process, the regulating parameters include storing at least one regulating limit for at least one of the operating parameters of the machine, termed monitored parameter, the actions b2) of the regulated production step further include comparing the new calculated value for a monitored parameter to the regulating limit, and in the event that this limit is exceeded, a breakdown in regulation alert is issued and the regulated production is continued from a new value of the monitored parameter, among: the value during the preceding production cycle, the value entered in the initializing phase, or a combination of said values.

Thus, the value of the monitored parameter cannot exceed a regulating limit beyond which regulation would suffer.

According to other features of the process, using a machine equipped with a first station and a second station, one of the stations being a reference station, each station being provided with a pressure sensor for measuring the pressure inside the preform of said station and with a preblowing solenoid valve having a response time between an instant (TRo) of commanding the opening of the solenoid valve and the effective start of the increase in pressure in the preform, in which process the regulating parameters comprise the start of the preblowing, and a predetermined response time, and in which in addition to a new value for the instant (TRo) of commanding the opening of the preblowing solenoid valve, a real response time is calculated, if the real response time is greater than the predetermined response time:

an alert that the reference station is drifting is issued, and/or for a subsequent production cycle, the reference instant of opening of the solenoid valve of the second station is calculated, the second station then being considered as a new reference station.

Thus, in the event of an excessively long response time, for example owing to ageing of the preblowing solenoid valve of the reference station, making the regulation reference inaccurate, a reference station drift alert is issued, and/or a new station is identified to serve as the reference station for the next production cycles, thus avoiding regulating errors.

The present invention also relates to a machine for cyclical production by stretch blow molding using preforms made of plastic material, which comprises: a fluid source at a preblowing pressure, one or more stretch blow molding stations, each station comprising a mold having a cavity that is intended to receive a preform; a solenoid valve that is able to establish a connection between the interior of the preform, received in the cavity, and said fluid source with a predetermined preblowing flow rate (Dp); a device for commanding the opening and closing of the solenoid valve; a sensor that is able to measure the pressure inside the preform; a device for detecting an instant, termed real start of preblowing instant (Ar), at which the pressure in the preform begins to increase; a device for comparing this real instant (Ar) to a reference start of preblowing instant (Ac); a device for regulating an instant (TRo) of commanding the opening of the solenoid valve as a function of the result of this comparison, wherein it comprises a device for monitoring a possible change, imposed by the operator, to an operating parameter of the machine, a device for analyzing a succession of time curves of the pressure inside the preform during a stabilizing phase without regulation, and a device for updating at least one regulation reference, these being connected to the analysis device.

The machine makes it possible to implement a process according to the invention, being configured to detect any change imposed by an operator, analyze a succession of pressure time curves during a phase of stabilization without regulation, and update at least one regulation reference. Thus, the machine can continue regulation without requiring the intervention of an operator to update the regulation reference.

According to other features of the machine according to the invention, considered in isolation or in combination:

the abovementioned machine further comprises a controllable device that is able to vary the flow rate of pressurized fluid, or a controllable variable-flow rate solenoid valve; a device for detecting an instant at which the pressure in the preform reaches a peak, termed real preblowing pressure peak instant (Br); a device for comparing this real pressure peak instant (Br) to a reference pressure peak instant (Bc); a device for regulating the flow rate injected into the preform as a function of the result of this comparison.

the abovementioned machine further comprises a device for calculating a real gradient (PRab) of the increase in pressure between the pressure measured at the real start of preblowing instant (Ar) and the pressure measured at the real pressure peak instant (Br); a device for comparing this real gradient (PRab) to a reference gradient (PCab); a device for regulating the preblowing flow rate (Dp) injected into the preform as a function of the result of this comparison and/or a device for regulating the pressure of the pressurized fluid source as a function of the result of this comparison, and/or a device for regulating the nominal speed or the stretching time profile of a stretching rod as a function of the result of this comparison.

the abovementioned machine further comprises a device for detecting an instant, termed real end of preblowing instant, at which the pressure in the preform once again begins to increase; a device for comparing the real end of preblowing pressure (Fr) measured at this instant with an reference end of preblowing pressure (Fc); a device for regulating the preblowing flow rate (Dp) injected into the preform as a function of the result of this comparison.

Thus, the machine is configured to continue with the regulation whatever the outcome of the comparison between the reference start of preblowing instant and the real start of preblowing instant, between the reference pressure peak instant and the real pressure peak instant, between the reference gradient and the real gradient of the pressure increased between the start of preblowing and the pressure peak, and between the reference end of preblowing instant and the real end of preblowing instant.

The present invention also relates to:

a computer program product designed to be implemented on a machine for manufacturing containers as mentioned above, which comprises instructions for commanding the opening and closing of the preblowing solenoid valve; commanding the preblowing flow rate (Dp); taking into account the real start of preblowing instant (Ar); taking into account the reference start of preblowing instant (Ac); comparing the real start of preblowing instant (Ar) to the reference start of preblowing instant (Ac); regulating the instant (TRo) of commanding the opening of the solenoid valve as a function of the result of this comparison, wherein it comprises instructions for detecting at least one change, imposed by the operator, of an operating parameter of the machine;

instructions for measuring a set of preblowing curves and storing at least the real positions of the characteristic points of a set of preblowing curves, and suspending the modification of the operating parameters of the machine during a predetermined stabilizing period, and instructions for updating at least one regulating parameter and once again authorizing regulated production.

a computer program product according to the preceding claim, further comprising instructions for taking into account a real preblowing pressure peak instant (Br) in the preform; taking into account a reference preblowing pressure peak instant (Bc) in the preform; comparing the real preblowing pressure peak instant (Br) in the preform to the reference preblowing pressure peak instant (Bc) in the preform; regulating the preblowing flow rate (Dp) as a function of the result of this comparison;

and/or for calculating a real gradient (PRab) between the pressure measured at the real instant (Ar) of the start of the preblowing in the preform and the pressure measured at the real preblowing pressure peak instant (Br); calculating a reference gradient (PCab) between the pressure measured at the reference instant (Ac) of the start of the preblowing in the preform and the pressure measured at the reference preblowing pressure peak instant (Bc); comparing the real gradient (PRab) to the reference gradient (PCab); regulating the preblowing flow rate (Dp) as a function of the result of this comparison and/or the pressure of the pressurized fluid source, and/or the nominal speed or the stretching time profile of the stretching rod;

and/or for taking into account a real end of preblowing pressure (Fr); taking into account a reference end of preblowing pressure (Fc); comparing the real end of preblowing pressure (Fr) to the reference end of preblowing pressure (Fc); regulating the preblowing flow rate (Dp) as a function of the result of this comparison.

The computer program product is designed to implement the process according to the invention, and in particular makes it possible to automate the updating of at least one regulating parameter by once again authorizing regulated production. Thus, the updating is implemented with increased speed and precision, limiting the reduction in productivity and possible regulation errors.

According to another aspect, the invention also relates to a process for regulating a cyclical production of containers by stretch blow molding from preforms made of plastic material in a machine comprising one or more stretch blow molding stations, each designed to produce a container during a production cycle, and each provided with a preblowing solenoid valve fluidically connecting the preform to a pressurized fluid source providing a preblowing flow rate during a preblowing phase, the regulating process comprising:

a) an initializing phase including a step of installation by an operator and of storing of a plurality of operating parameters of the machine during the production cycle, and of regulating parameters including at least one reference template of at least one characteristic region of a preblowing curve corresponding to the pressure prevailing inside the preform during at least one part of the preblowing, said reference template being determined by a reference time interval and/or a reference pressure interval, and/or a reference curve portion;

b) a regulated production phase during which, for each production cycle, at least one preform is stretched and blown by injection of a pressurized fluid in each station and during which:

b1) for at least one reference station of the machine, the preblowing curve including the characteristic region is measured and stored, and a real portion of the preblowing curve is calculated or determined, corresponding to said characteristic region for the measured preblowing curve, and b2) a new value of at least one operating parameter of the machine (1) is calculated and stored as a function of a difference between the real portion of the curve and said reference template, wherein, in this regulating process, the regulated production phase includes a step b3) of monitoring a possible change, imposed by the operator, of a value of an operating parameter of the machine, the regulating process further comprising a phase of automatically updating the regulating parameter(s), which is implemented in the event of an imposed change of an operating parameter of the machine, involving:

c1) a stabilizing step during which the production is continued from the parameter imposed during a predetermined stabilizing period, and for each production cycle the actions b1) are executed, and the actions b2) are suspended, and c2) a step of correcting the reference template as a function of the real portion stored during the stabilizing step, in order to continue with the regulated production phase.

The invention also relates to a machine for cyclical production by stretch blow molding using preforms made of plastic material, which comprises: a fluid source at a preblowing pressure, one or more stretch blow molding stations, each station comprising a mold having a cavity that is intended to receive a preform; a solenoid valve that is able to establish a connection between the interior of the preform received in the cavity and said source with a predetermined preblowing flow rate; a device for commanding the opening and closing of the solenoid valve; a sensor that is able to measure the pressure inside the preform; a device for detecting a real portion of a preblowing curve corresponding to a predetermined characteristic region; a device for comparing this real curve to a reference template corresponding to the predetermined characteristic region; a device for regulating an instant of commanding the opening of the solenoid valve as a function of the result of this comparison, the machine comprising a device for monitoring a possible change, imposed by the operator, to an operating parameter of the machine, a device for analyzing a succession of time curves of the pressure inside the preform during a stabilizing phase without regulation, and a device for updating, these being connected to the analysis device, the device for updating being designed to update the reference template.

The invention will be better understood upon reading the following purely exemplary description, with reference to the appended drawings, in which.

Figure 1:
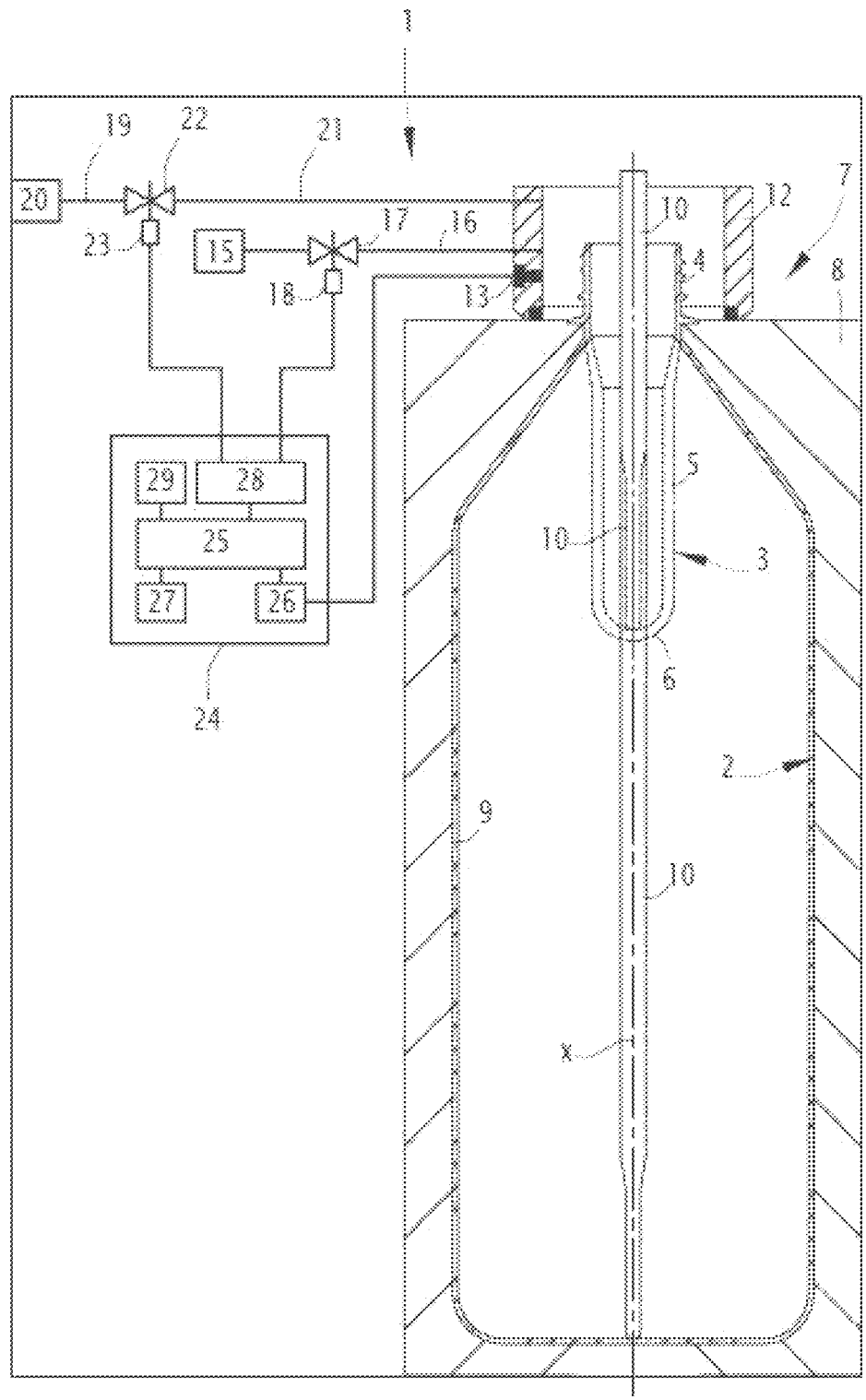
FIG. 1 is a schematic view illustrating a machine for cyclical production of containers by stretch blow molding, and more specifically a mold of a stretch blow molding station, in which a container (in solid lines) is blown from a preform (in dotted lines)

FIG. 1 depicts part of a machine 1 for cyclical production of containers 2 by stretch blow molding from preforms 3 made of plastic material.

The preforms 3 are for example made of polyethylene terephthalate (PET).

Each preform 3 comprises a neck 4 and a cylindrical body 5 that ends in a hemipsherical bottom 6.

The machine 1 comprises at least one stretch blow molding station 7, a single station 7 being depicted in FIG. 1. Each station 7 is typically mounted on a frame, for example at the periphery of a carousel.

The station 7 comprises a mold 8 having a cavity 9 that is designed to receive a preform 3, and having the shape of the container that is to be made.

The station 7 preferably comprises a stretching rod 10 that is mounted so as to be able to slide relative to the mold 8 along a main axis X (generally an axis of revolution).

The station 7 comprises a device (not shown) for controlling the axial movement of the rod 10, preferably of the electromagnetic type.

The station 7 comprises a nozzle 12 that tops an upper face of the mold 8, and is able to cover the neck 4 of the preform 3 that projects therefrom.

The station 7 comprises a pressure sensor 13, typically mounted on the nozzle 12 and able to measure the pressure inside the preform 3.

The machine 1 further comprises a preblowing circuit 14 that comprises a source 15 of preblowing fluid. The preblowing fluid is for example a gas, preferably air. The preblowing fluid is pressurized to a preblowing pressure, typically between 5 and 16 bar. The preblowing circuit 14 comprises a duct 16 connecting the fluid source 15 to the nozzle 12. A preblowing solenoid valve 17 is interposed between the fluid source 15 and the nozzle 12. A controllable device 18 that is able to vary the pressurized fluid flow rate Dp is preferably mounted on the preblowing solenoid valve 17, or the preblowing solenoid valve 17 is of the controllable variable flow rate type. The preblowing solenoid valve 17 is able to establish a connection between the interior of the preform 3, received in the cavity 9, and said fluid source 15 according to a predetermined preblowing flow rate Dp. The preblowing flow rate is typically measured using a flowmeter.

The preblowing phase is to be understood as a phase during at least part of which the stretching rod 10 stretches the preform 3, and during which the preform 3 is fluidically connected, by the preblowing solenoid valve 17, to the preblowing fluid source 15.

The machine 1 further comprises a blowing circuit 19 that comprises a source 20 of blowing fluid. The blowing fluid is for example a gas, preferably air. The blowing fluid is pressurized to a blowing pressure, typically between 16 and 40 bar. The blowing circuit 19 comprises a duct 21 connecting the blowing fluid source 20 to the nozzle 12. A blowing solenoid valve 22 is interposed between the blowing fluid source 20 and the nozzle 12. A controllable device 23 that is able to vary the pressurized fluid flow rate Ds is preferably mounted on the blowing solenoid valve 22, or the blowing solenoid valve 22 is of the controllable variable flow rate type.

The machine 1 further comprises a device for controlling the opening and the closing of the preblowing solenoid valve 17.

Preferably, the machine 1 further comprises a device for controlling the opening and the closing of the blowing solenoid valve 22.

The machine 1 further comprises an electronic control unit 24, in particular in the form of a programmable logic controller (PLC), electrically connected to the pressure sensor 13, to the solenoid valves 17, 22 via their controllable devices 18, 23 to regulate the respective flow rates, and as the case may be to the device for controlling the movement of the rod 10.

More specifically, the control unit 24 typically comprises:
- a processor 25,
- an analog input module 26 connected to the pressure sensor 13 in order to collect the measurements therefrom and convert them into a digital signal to be processed by the processor 25,
- a memory 27 connected to the processor 25 for storing data output by the pressure sensor 13 after conversion,
- an analog output module 28 controlled by the processor 25, and controlling the solenoid valves 17, 22 via their controllable devices 18, 23 that are able to vary the flow rate of pressurized fluid, in such a way as to modulate the fluid flow rates Dp, Ds provided to the nozzle 12, and by the devices for controlling the opening and the closing of the solenoid valves 17, 22 so as to open or close the solenoid valves 17, 23. The analog output module 28 controls, where relevant, the device for controlling the axial movement of the rod 10.
- a communication interface 29 for implementing, in the control unit 24, a computer program that governs its operation. For the concrete embodiment of the nozzle 12 and the integration of the solenoid valves 17, 22 with the controllable devices 18, 23 that are able to vary the flow rate, reference can be made to the applicant's application FR 2 872 082, or to its international equivalent WO 2006/008380.

The machine 1 further comprises a device for monitoring a possible change, imposed by the operator, to an operating parameter of the machine 1, a device for analyzing a succession of time curves of the pressure inside the preform 3 during a stabilizing phase without regulation, and a device for updating at least one regulation reference, these being connected to the analysis device.

The device for monitoring a possible imposed change typically comprises the processor 25.

The device for analyzing a succession of time curves for the pressure inside the preform during a phase of stabilization without regulation typically comprises the processor 25, the analog input module 26 connected to the pressure sensor 13 in order to collect the measurements therefrom and convert them into a digital signal for processing by the processor 25, and the memory 27 connected to the processor 25 for storing data from the pressure sensor 13 after conversion.

The device for updating at least one regulation reference typically comprises the processor 25 and the analog output module 28 controlled by the processor 25.

The updating device is able to update at least one regulation reference as a function of the analysis of the succession of pressure time curves during the phase of stabilization without regulation.

The monitoring device, the analysis device and the updating device make it possible to continue the regulation of the cyclical production of containers even after an operating parameter of the machine 1 has been changed.

Preferably, the machine 1 further comprises a device for detecting an instant, termed real start of preblowing instant Ar, at which the pressure in the preform 3 begins to increase.

Figure 2:
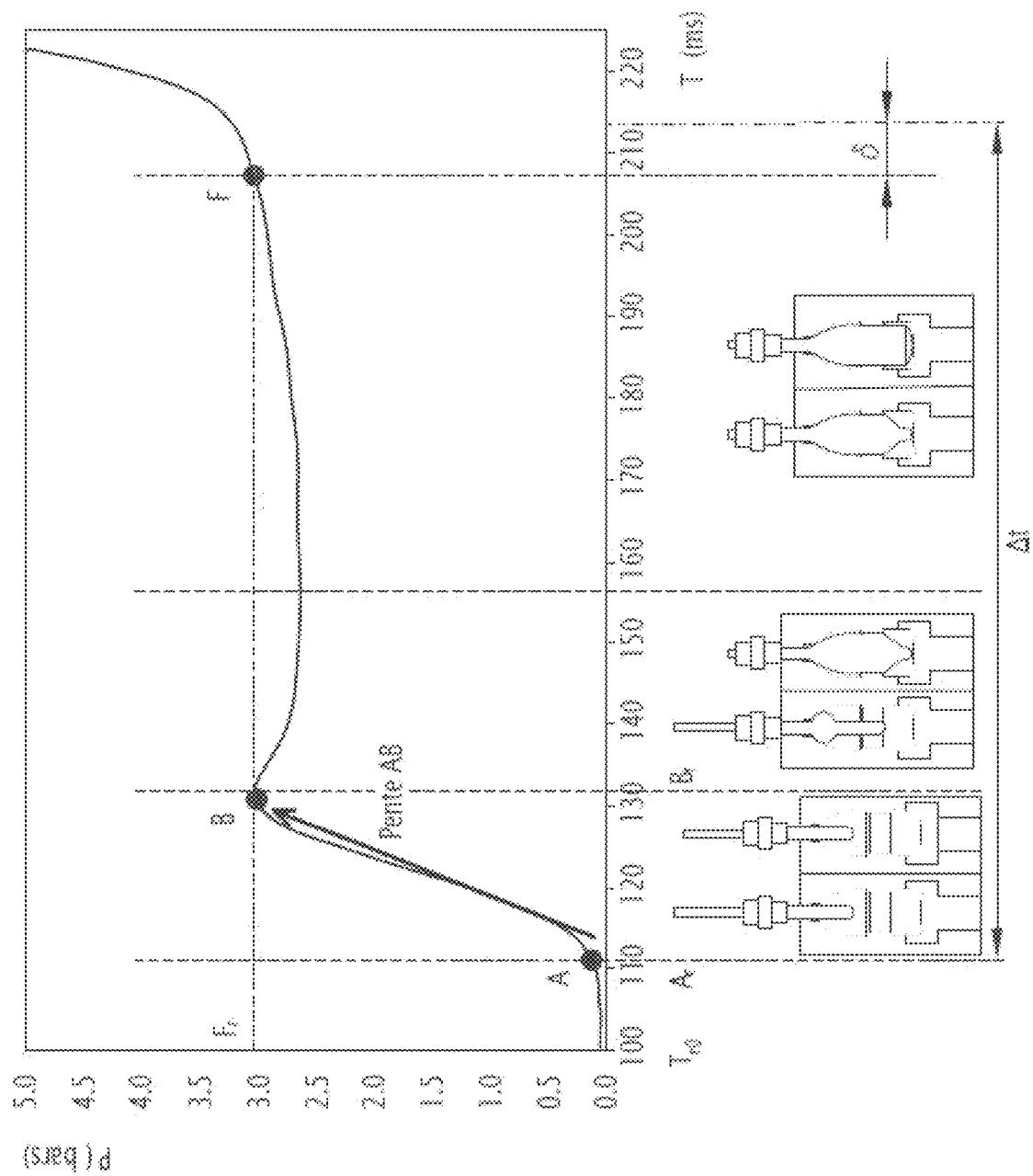
FIG. 2 is a curve illustrating the variations in pressure inside the preform during preblowing.

As shown in FIG. 2, the start of preblowing instant is a characteristic point A of a preblowing curve corresponding to the pressure inside the preform 3 during at least part of the preblowing.

The device for detecting the real start of preblowing instant Ar typically comprises the processor 25, which is able to detect the real instant Ar on the basis of the data collected by the pressure sensor 13, converted by the analog input module 26 and stored by the memory 27.

According to this embodiment, the machine 1 typically also comprises a device for comparing the real start of preblowing instant Ar to a reference start of preblowing instant Ac, and a device for regulating an instant TRo of commanding the opening of the preblowing solenoid valve 17 as a function of the result of this comparison.

The reference instant Ac is determined and set by an operator depending on a process for producing a container having the characteristics desired for the final container.

The real start of preblowing instant Ar can differ from the reference start of preblowing instant Ac when the opening of the preblowing solenoid valve 17 occurs too early, in which case the real start of preblowing instant Ar is brought forward relative to the reference start of preblowing instant Ac, or too late, in which case the real start of preblowing instant Ar is delayed relative to the reference start of preblowing instant Ac. The device for comparing the real start of preblowing instant Ar to a reference start of preblowing instant Ac typically comprises the processor 25 that is able to compare the data from said real instant Ar to the data from said reference instant Ac, which are stored in the memory 27.

The device for regulating the instant TRo of commanding the opening of the preblowing solenoid valve 17 as a function of the result of this comparison typically comprises the processor 25, which is able to control the analog output module 28 that controls the preblowing solenoid valve 17 via the device for commanding the opening and closing of the preblowing solenoid valve 17.

Preferably, the machine 1 further comprises a device for detecting a real pressure peak instant Br at which the pressure in the preform 3 reaches a peak.

The pressure peak instant is a characteristic point B of the preblowing curve.

The device for detecting the real pressure peak instant Br typically comprises the processor 25, which is able to detect the real instant Br on the basis of the data collected by the pressure sensor 13, converted by the analog input module 26 and stored by the memory 27.

According to this embodiment, the machine 1 typically also comprises a device for comparing the real pressure peak instant Br to a reference pressure peak instant Bc, and a device for regulating the flow rate Dp injected into the preform 3 as a function of the result of this comparison.

The reference instant Bc is determined and set by an operator depending on a process for producing a container having the characteristics desired for the final container.

The real pressure peak instant Br can differ from the reference pressure peak instant Bc when the preblowing fluid flow rate Dp is too high, in which case the real pressure peak instant Br is brought forward relative to the reference pressure peak instant Bc, or too low, in which case the real pressure peak instant Br is delayed relative to the reference pressure peak instant Bc.

The device for comparing the real pressure peak instant Br to a reference pressure peak instant Bc typically comprises the processor 25 that is able to compare the data from said real instant Br to the data from said reference instant Bc, which are stored in the memory 27.

The device for regulating the preblowing flow rate Dp injected into the preform 3 as a function of the result of this comparison typically comprises the processor 25, that is able to control the analog output module 28 controlling the preblowing solenoid valve 17 via the controllable device 18 that is able to vary the flow rate of pressurized fluid injected into the preform 3, so as to modulate the preblowing flow rate Dp.

Preferably, the machine 1 further comprises a device for calculating a real gradient PRab of the increase in pressure between the pressure measured at the real pressure peak instant Br and the pressure measured at the real start of preblowing instant Ar.

The value of the real gradient PRab therefore depends on the real start of preblowing instant Ar, on the real pressure peak instant Br and on the pressure values measured at these instants.

The device for calculating the real gradient PRab typically comprises the processor 25 that is able to calculate the real gradient between the characteristic points A (start of preblowing) and B (pressure peak), these being measured by the pressure sensor 13, converted by the analog input module 26 and stored by the memory 27.

The gradient between the pressure measured at the pressure peak instant and the pressure measured at the start of preblowing instant is a characteristic point Pab of the preblowing curve. Since the pressure time curve between the start of preblowing and the pressure peak is not rectilinear, the real gradient PRab is calculated in a predetermined manner, chosen from the many options available to a person skilled in the art, such as an average of the derivatives, or an average of the pressure increases for identical time increments, etc.

According to this embodiment, the machine 1 typically also comprises a device for comparing the real gradient PRab to a reference pressure increase gradient PCab, and a device for regulating the flow rate Dp injected into the preform 3 as a function of the result of this comparison.

The device for comparing the real gradient PRab to a reference gradient PCab typically comprises the processor 25 that is able to compare the data from said real gradient PRab to the data from said reference gradient PCab, which are stored in the memory 27.

The device for regulating the flow rate Dp injected into the preform 3 as a function of the result of this comparison typically comprises the processor 25, that is able to control the analog output module 28 controlling the preblowing solenoid valve 17 via the controllable device 18 that is able to vary the flow rate of pressurized fluid injected into the preform 3, so as to modulate the preblowing flow rate Dp.

Preferably, the machine 1 further comprises a device for detecting an instant, termed real end of preblowing instant, at which the pressure in the preform 3 once again begins to increase after the dip in pressure. This increase is due to the fact that, after a pause during which the preblowing solenoid valve 17 is kept open, blowing is initiated by simultaneously commanding the closure of the preblowing solenoid valve 17 and the opening of the blowing solenoid valve 22, which causes a sudden increase in the pressure in the preform 3.

The device for detecting the real end of preblowing instant typically comprises the processor 25, which is able to detect the real end of preblowing instant on the basis of the data collected by the pressure sensor 13, converted by the analog input module 26 and stored by the memory 27.

The real end of preblowing instant is typically determined as follows:

$$\text{real end of preblowing instant} = \text{real start of preblowing instant} + \Delta t - \delta \quad \text{[Math 1]}$$

where: $\Delta t$ is a predetermined duration of opening of the preblowing solenoid valve 17, and $\delta$ is a predetermined constant corresponding to the response time of the blowing solenoid valve 22 between the opening command instant and the instant of its effective opening.

Δt is typically between 50 and 300 ms.

δ is typically equal to 10 ms.

The end of preblowing instant is a characteristic point F of the preblowing curve.

According to this embodiment, the machine 1 typically also comprises a device for comparing a real end of preblowing pressure Fr, corresponding to the pressure measured at the detected real end of preblowing instant, to a reference end of preblowing pressure Fc, and a device for regulating the flow rate Dp injected into the preform 3 as a function of the result of this comparison.

The reference pressure Fc is determined and set by an operator depending on a process for producing a container having the characteristics desired for the final container.

The real end of preblowing instant Fr can differ from the reference end of preblowing instant Fc when the preblowing fluid flow rate Dp is too high, in which case the real end of preblowing pressure Fr is higher than the reference end of preblowing pressure Fc, or too low, in which case the real end of preblowing pressure Fr is lower than the reference end of preblowing pressure Fc.

The device for comparing the real instant typically comprises the processor 25 that is able to compare the data from said real pressure Fr to the data from said reference pressure Fc, which are stored in the memory 27.

The device for regulating the preblowing flow rate Dp injected into the preform 3 as a function of the result of this comparison typically comprises the processor 25, that is able to control the module 28 controlling the preblowing solenoid valve 17, which can be adjustable or associated with an adjustable flow rate limiter, via the controllable device 18 that is able to vary the flow rate of pressurized fluid injected into the preform 3, so as to modulate the preblowing flow rate Dp.

The characteristic points A, B, Pab and F are chosen in order to regulate the machine 1, ensuring good synchronization of the bidirectional stretching and good distribution of the material during preblowing.

There follows a description of a process for regulating a cyclical production of containers by stretch blow molding from preforms 3 made of plastic material in the above-described machine 1.

Figure 3:
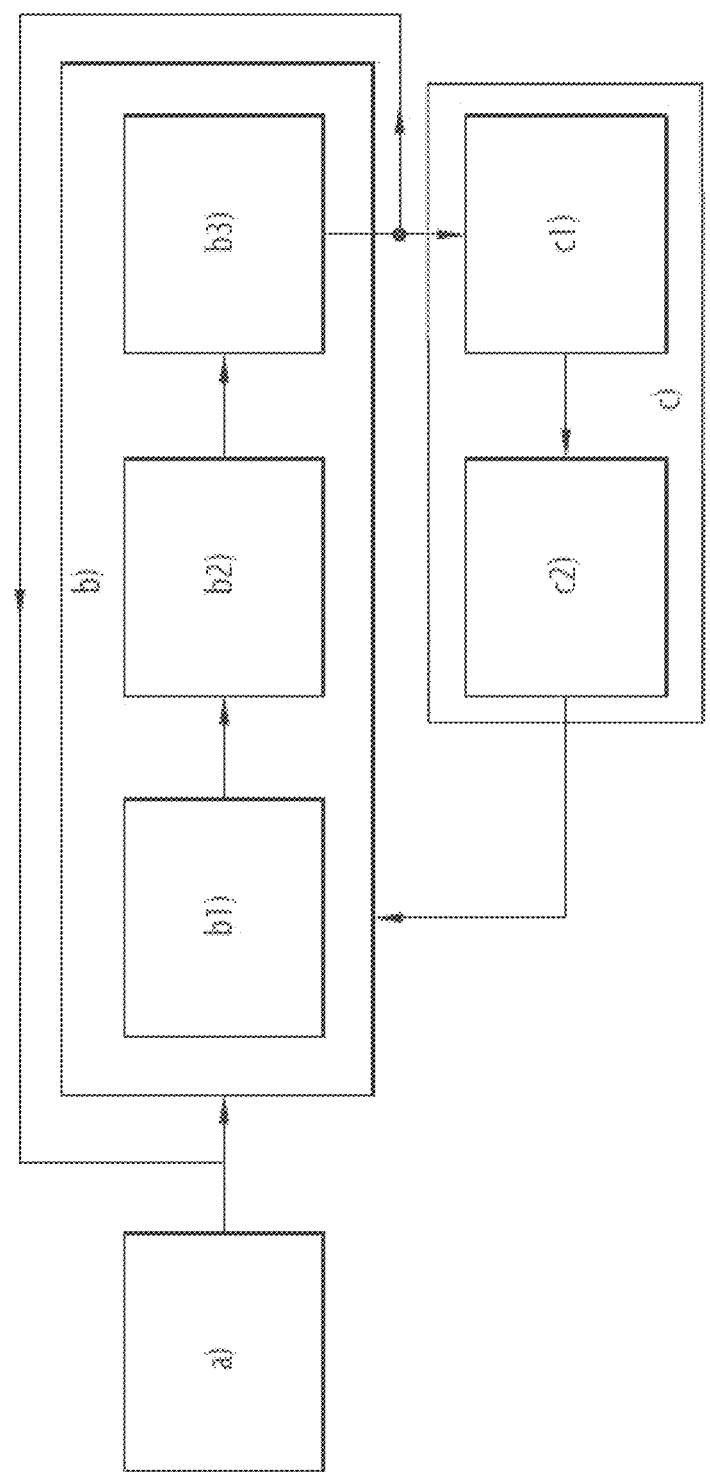
FIG. 3 shows a schematic diagram of the regulation process according to the invention.

FIG. 3 shows a schematic diagram of the regulation process.

The process comprises a) an initializing phase including a step of installation by an operator and of storing of a plurality of operating parameters of the machine 1 during the production cycle, and of regulating parameters including at least one reference position Ac, Bc, PCab and Fc of at least one characteristic point A, B, Pab, F of the preblowing curve, said reference position Ac, Bc, PCab, Fc being determined by a reference instant and/or a reference pressure. When the reference position is determined by a reference instant Ac, Bc, the reference position corresponds to an instant at which the pressure inside the preform 3 is measured at said characteristic point A, B, said characteristic point then being characterized by a particular instant.

When the reference position is determined by a reference pressure Fc, the reference position corresponds to the pressure measured at the instant of said characteristic point F, said characteristic point F then being characterized by a particular pressure value.

The operating parameters of the machine 1 are typically among: the instant TRo of commanding the opening of the preblowing solenoid valve 17, a value or a time profile of the preblowing flow rate Dp, the preblowing pressure or a time profile of a travel of the stretching rod 10.

The instant of commanding opening TRo differs from the reference start of preblowing instant Ac since there is a response time between the instant at which the opening of the preblowing solenoid valve is commanded and the instant at which the preblowing effectively starts inside the preform 3.

The storing of a plurality of operating parameters of the machine 1 during the production cycle, and of regulation parameters, is typically performed by the memory 27.

Each pressure measurement is performed by the pressure sensor 13 of the station 7 in question.

Preferably, each measurement is an average of five measurements taken during five cycles.

The reference start of preblowing instant Ac is typically determined by the instant at which the measured pressure inside a preform 3 begins to increase.

The reference start of preblowing instant Ac is typically set by an operator using the communication interface 29 in the control unit 24, stored by the memory 27, processed by the processor 25, which commands, via the analog output module 28, the device for commanding the opening of the preblowing solenoid valve 17.

The reference start of preblowing instant Ac is generally reached several milliseconds after the opening of the preblowing solenoid valve 17.

The reference pressure peak instant Bc is typically set by an operator using the communication interface 29 in the control unit 24, stored by the memory 27, processed by the processor 25, which commands, via the analog output module 28, the preblowing solenoid valve 17 via the controllable device 18 that is able to vary the preblowing flow rate Dp.

The reference preblowing pressure peak instant Bc is reached several milliseconds after the opening of the preblowing solenoid valve 17.

The reference gradient PCab is typically set by an operator using the communication interface 29 in the control unit 24, stored by the memory 27, processed by the processor 25, which commands, via the analog output module 28, the preblowing solenoid valve 17 via the controllable device 18 that is able to vary the preblowing flow rate Dp, and/or the pressure value of the preblowing fluid source 15, and/or the nominal speed value or stretching time profile value of the stretching rod 10 via the device for controlling the axial movement of the rod 10.

The reference end of preblowing pressure Fc typically corresponds to the pressure at the reference end of preblowing instant, when the pressure in the preform 3 begins to increase again.

The reference end of preblowing pressure Fc is typically set by an operator using the communication interface 29 in the control unit 24, stored by the memory 27, processed by the processor 25, which commands, via the analog output module 28, the preblowing solenoid valve 17 via the controllable device 18 that is able to vary the preblowing flow rate Dp.

The reference end of preblowing pressure Fc is generally several bar.

The process further comprises b) a regulated production phase comprising a step b1) and a step b2).

During said regulated production phase b), for each production cycle, at least one preform 3 is stretched and blow molded by injection of a pressurized fluid, typically from the preblowing fluid source 15 then from the blowing fluid source 20, in each station 7.

The injection of preblowing fluid is typically triggered by the opening of the preblowing solenoid valve 17.

The preblowing fluid is injected at a nominal preblowing flow rate, then according to a determined time profile for the preblowing flow rate Dp.

Preferably, at the same time as the injection of preblowing fluid, the stretching rod 10 is set in operation at a nominal speed, then according to a determined time profile for the stretching.

The nominal speed for the stretching rod is understood to be between 1 m/s and 2.5 m/s.

At the end of the preblowing, the preblowing solenoid valve 17 is closed, and the injection of blowing fluid is typically triggered by the opening of the blowing solenoid valve 22.

During said regulated production phase b), in step b1), for at least one station 7 of the machine 1, termed reference station, the preblowing curve including the characteristic point A, B, Pab, F is calculated on the basis of the pressure measurements typically taken by the pressure sensor 13 and stored in the memory 27, then the curve is stored, and a real instant and/or a real pressure Ar, Br, PRab, Fr is calculated or determined, corresponding to said characteristic point A, B, Pab, F for the measured preblowing curve.

The real start of preblowing instant Ar is detected by the device for detecting the real start of preblowing instant Ar.

The real preblowing pressure peak instant Br is detected by the device for detecting the real preblowing pressure peak instant Br.

The real gradient PRab is calculated by the device for calculating the real gradient PRab between the pressure measured at the real pressure peak instant Br and the pressure measured at the real start of preblowing instant.

The real end of preblowing instant Fr is detected by the device for detecting the real end of preblowing instant Fr.

The total preblowing time for a preform 3 is typically between 50 ms and 300 ms.

In step b2), a new value of at least one operating parameter of the machine 1 is calculated and stored as a function of a difference between the real instant and the reference instant and/or between the real pressure and the reference pressure, corresponding to the characteristic point A, B, Pab, F.

The new value of the operating parameter is calculated by the processor 25 and stored by the memory 27.

Preferably, the regulating parameters further include storing at least one tolerance for accepting the real position Ar, Br, PRab, Fr of the at least one characteristic point A, B, Pab, F of the preblowing curve chosen relative to the reference position Ar, Br, PRab, Fc of said characteristic point A, B, Pab, F, and there is no calculation of a new value for said operating parameter of the machine 1 if said difference is smaller than the acceptance tolerance.

Figure 4:
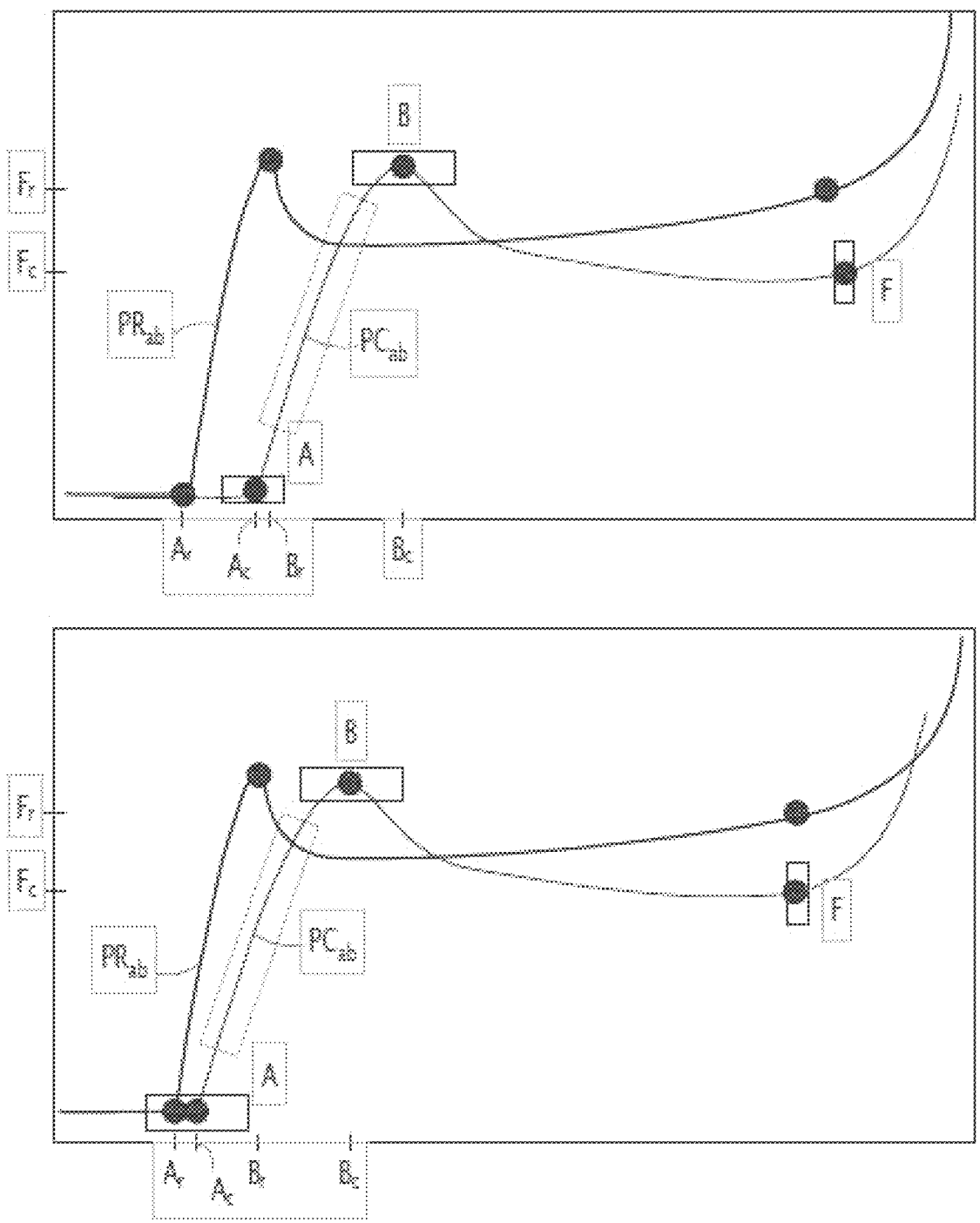
FIG. 4 represents two curves illustrating the regulation of the machine using a reference point for the start of the preblowing.
Figure 5:
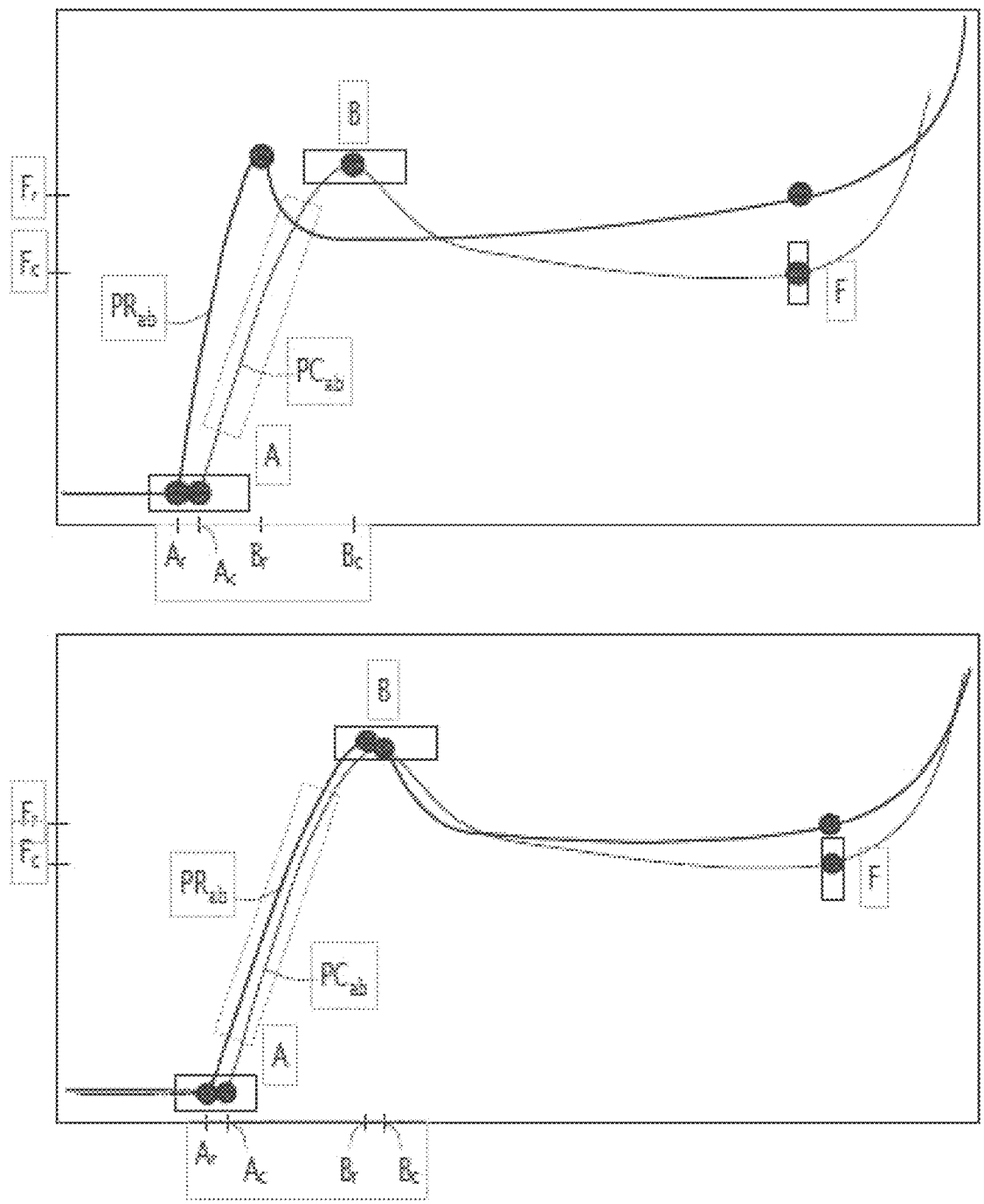
FIG. 5 represents two curves illustrating the regulation of the machine using a reference point for the pressure peak and for the gradient of the curve between the start point of the preblowing and the pressure peak.
Figure 6:
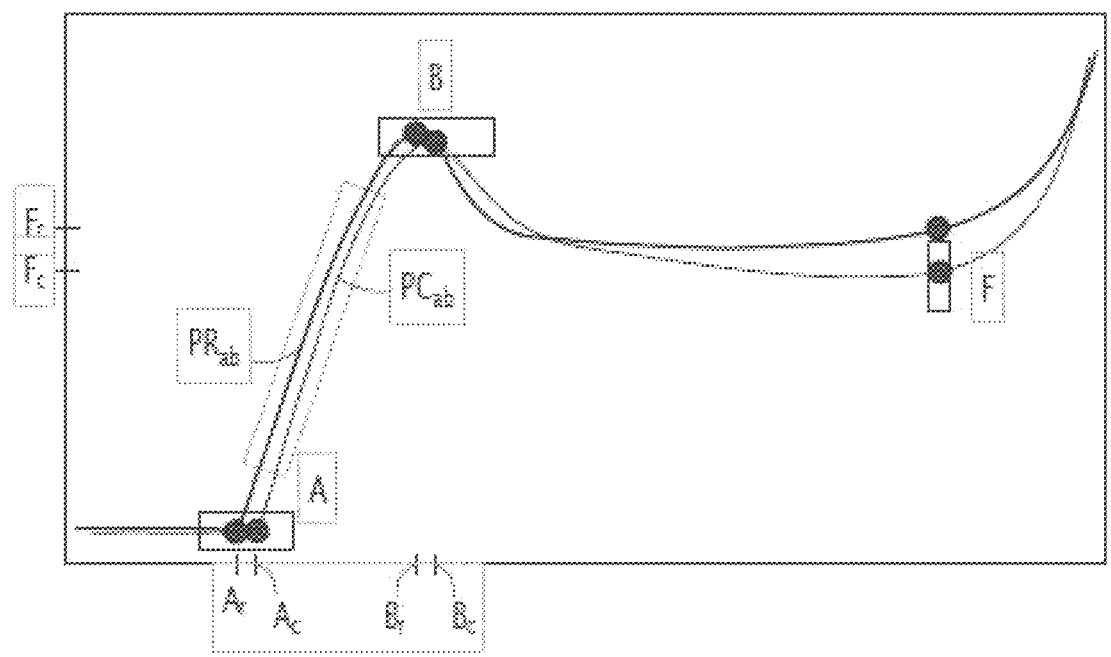
FIG. 6 represents two curves illustrating the regulation of the machine using a reference point for the end of the preblowing.
Figure 6:
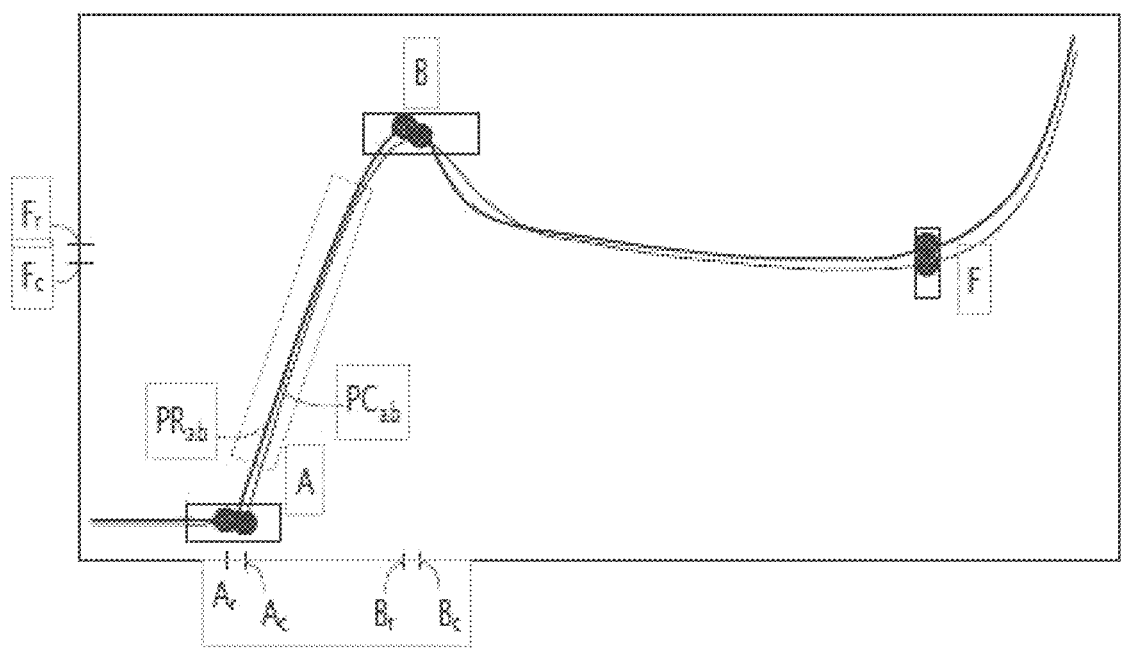

The acceptance tolerance around each point is represented in FIGS. 4 to 6 by rectangles.

Preferably, the acceptance tolerance is an acceptance tolerance in terms of time for the characteristic points A (start of preblowing) and B (preblowing pressure peak), and an acceptance tolerance in terms of pressure for the characteristic point F (end of preblowing).

Also preferably, the acceptance tolerance for the characteristic point Pab is a tolerance in terms of gradient.

For example, the acceptance tolerance for the characteristic point A is between 1 and 3 ms.

For example, the acceptance tolerance for the characteristic point B is between 1 and 3 ms.

For example, the acceptance tolerance for the characteristic point Pab is between 15 mbar/ms and 60 mbar/ms.

For example, the acceptance tolerance for the characteristic point F is between 0.1 bar and 0.3 bar.

In each of FIGS. 4 to 6, the curve comprising the characteristic points indicated as A, B, F, with acceptance tolerances illustrated by rectangles, illustrates regulation parameters stored during a phase of initializing the process. The other curve of each figure illustrates the real pressure measured in the preform during preblowing. The upper figure illustrates the curves during the step "b1" of the regulation phase. The lower figure illustrates the step "b2" of the regulation phase, relating to the characteristic point to which each figure relates.

For example, in the embodiment illustrated by FIG. 4, the real start of preblowing instant Ar is compared to the reference start of preblowing instant Ac using the device for comparing the real start of preblowing instant Ar to the reference start of preblowing instant Ac.

If the real start of preblowing instant Ar in the preform 3 of the reference station measured in step b1) is respectively late or early (as in the example of FIG. 4), by a time difference with respect to the reference start of preblowing instant Ac for said reference station that is greater than the acceptance tolerance, the new value calculated in step b2) as the instant TRo of commanding the opening of the preblowing solenoid valve 17 of each of the stretch blow molding stations 7 is then respectively brought forward or delayed (as in the example of FIG. 4), by said time difference in all of the stretch blow molding stations 7, for example using the device for regulating the instant TRo of commanding the opening TRo of the preblowing solenoid valve 17.

This makes it possible to increase the reliability of the production and limit the manufacturing defects on the other stations 7.

In the example shown in FIG. 4, the regulation parameters stored during the initialization phase include the reference start of preblowing instant Ac and, advantageously, an acceptance tolerance for this instant. During step "b1" of the regulation phase, the characteristic point on the measured pressure curve is the real start of preblowing instant Ar. The operating parameter of the machine 1 that is able to have an influence on the start of preblowing is the instant TRo of commanding the opening of the solenoid valve. The step "b2" of the regulation phase includes calculating, on the basis of the measured curve, the real start of preblowing instant Ar, and calculating a difference with respect to the reference start of preblowing instant Ac. It may advantageously include comparing the calculated difference to the regulating limit. In the event of any such limit being exceeded, it includes calculating a new instant TRo of commanding the preblowing solenoid valve 17 as a function of the calculated difference, and possibly of part or all of the acceptance tolerance relating to the start of preblowing instant. This new value for a parameter of the machine 1 will be taken into account during the subsequent cycle—or one of the subsequent cycles—of production of containers.

In the example shown in FIG. 5, the regulation parameters stored during the initialization phase include the average gradient PCab between the reference start of preblowing instant Ac and the preblowing pressure peak B, and a possible acceptance tolerance for this gradient. They may advantageously comprise—though this is not compulsory—the regulation parameters for the embodiment depicted in FIG. 4.

The step "b1" of the regulating phase for the embodiment of FIG. 5 involves calculating the average gradient PRab between the start of preblowing and the preblowing pressure peak, on the basis of the measured pressure curve, and a difference between this real gradient PRab and the reference gradient PCab. It may advantageously include comparing the calculated difference to any regulating limit for the gradient PCab. This step "b1" of the regulation phase may also advantageously comprise—though this is not compulsory—the calculations performed during the step "b1" of the embodiment of FIG. 4.

The machine parameters that might have an influence on the average gradient are: the nominal flow rate or the time profile of the flow rate of the preblowing fluid, the nominal speed or the time profile of the speed of stretching by the rod 10, the nominal pressure or the time profile of the preblowing pressure, or a combination of one or more of these parameters.

The step "b2" of the embodiment illustrated in FIG. 5 involves calculating a new value for one or more of the parameters of the machine 1 that might have an influence on the gradient PRab, as a function of the calculated difference and possibly part or all of the acceptance tolerance relating to the gradient PRab. This step "b2" of the regulation phase may also advantageously comprise—though this is not compulsory—the calculation of the parameter of the machine 1, performed for the embodiment of FIG. 4.

The new value of one or more of said machine parameters are applied as the setpoint during the subsequent cycle—or one of the subsequent cycles—of production of containers. In the event that the regulation phase also comprises the actions of the regulation phase of the embodiment illustrated in FIG. 4, the new machine parameter setpoints may be applied during the same subsequent production cycle, or during different subsequent production cycles.

In the example shown in FIG. 6, the regulation parameters stored during the initialization phase include the end of preblowing pressure, and a possible acceptance tolerance for this pressure. They may advantageously comprise—though this is not compulsory—the regulation parameters for the embodiment depicted in FIG. 4 and/or FIG. 5.

The step "b1" of the regulation phase for the embodiment of FIG. 6 involves calculating, on the basis of the measured pressure curve, the end of preblowing pressure, and a difference between this pressure Fr and the reference pressure Fc. It may advantageously include comparing the calculated difference to any regulating limit for the pressure Fc. This step "b1" of the regulation phase may also advantageously comprise—though this is not compulsory—the calculations performed during the step "b1" of the embodiment of FIG. 4 and/or FIG. 5.

The machine parameters that might have an influence on the end of preblowing pressure are: the time profile of the flow rate of the preblowing fluid, the nominal pressure or the time profile of the preblowing pressure, or a combination of one or more of these parameters.

The step "b2" of the embodiment depicted in FIG. 6 involves calculating a new value for one or more of the parameters of the machine 1 that might have an influence on the end of preblowing pressure Fr as a function of the calculated difference and possibly part or all of the acceptance tolerance relating to the pressure Fr. This step "b2" of the regulation phase may also advantageously comprise—though this is not compulsory—the calculation of the parameter of the machine 1, performed for the embodiment of FIG. 4 and/or FIG. 5.

The new value of one or more of said machine parameters are applied as the setpoint during the subsequent cycle—or one of the subsequent cycles—of production of containers.

In the event that the regulation phase also comprises the actions of the regulation phase of the embodiment illustrated in FIG. 4, the new machine parameter setpoints may be applied during the same subsequent production cycle, or during different subsequent production cycles.

The regulated production phase b) of the process according to the invention also includes a step b3) of monitoring a possible change, imposed by the operator, of a value of an operating parameter of the machine 1.

The monitoring step b3) is implemented by the device for monitoring a possible change, imposed by the operator, of an operating parameter of the machine 1. An operator may impose the change of one or more operating parameters of the machine 1, for example in the event of the use of preforms 3 that have different characteristics in terms of composition, or heating temperature prior to preblowing, or to modify the production process as a function of the characteristics of the desired final container.

The regulating process also comprises a phase of automatically updating the regulating parameter(s), which is implemented in the event of an imposed change of an operating parameter of the machine 1.

The updating phase includes:

c1) a stabilizing step during which the production is continued from the operating parameter of the machine 1 imposed during a predetermined stabilizing period, and for each production cycle the actions b1) are executed, and the actions b2) are suspended.

During the step c1), the pressure time curves are for example stored, and analyzed by the device for analyzing a succession of time curves of the pressure inside the preform 3 during the stabilizing phase without regulation.

The duration of the stabilizing step is determined by reaching a production cycle during which a real instant or a real pressure measured at a characteristic point A, B, Pab, F is less than the acceptance tolerance for this real instant or pressure.

The stabilization step lasts for example between 1 and 3 minutes. It is noted that during this time the production is ongoing, it is only the regulation system that is in the automatic update phase, but the criteria for quality and acceptance of produced containers remain active.

c2) a step of correcting the reference instant and/or the reference pressure as a function of the real pressure and/or real instant values stored during the stabilizing step c1), in order to continue with the regulated production phase b).

The step c2) is for example implemented by the device for updating at least one regulation reference, connected to the analysis device.

For example, the regulated production phase b) first comprises a possible imposed change to the instant TRo of commanding the opening of the preblowing solenoid valve 17, then after the monitoring step b3), the stabilization step c1) is triggered until a production cycle during which the real instant Ar of starting preblowing into the preform 3 is stabilized, having a smaller variation than the start of preblowing acceptance tolerance. In the correction step c2), the real start of preblowing instant Ar is taken to be the new reference start of preblowing instant Ac. Then the real pressure peak instant Br is calculated for the following production cycles, and compared to the reference pressure peak instant Bc, for example using the device for comparing the real pressure peak instant Br to the reference pressure peak instant Bc.

If the real pressure peak instant Br is either earlier or later than the reference pressure peak instant Bc, by a time difference that is greater than the acceptance tolerance, a new value is calculated for the preblowing flow rate Dp, this being respectively reduced or increased with respect to the preblowing flow rate Dp during the production cycle during which the real pressure peak instant Br has been calculated, for example using the device for regulating the preblowing flow rate Dp injected into the preform 3, as is shown in FIG. 5.

The new value for the preblowing flow rate Dp is for example applied using the controllable device 18 that is able to vary the flow rate of pressurized fluid, or of the controllable variable flow rate solenoid valve.

Preferably, the regulated production phase b) first comprises the possible imposed change in the instant TRo of commanding the opening of the preblowing solenoid valve 17 then, after the monitoring step b3), the stabilization step c1) is triggered up to a production cycle during which the real instant Ar of the start of the preblowing in the preform 3 is smaller than the start of preblowing acceptance tolerance, then phase b) comprises the possible imposed change in the preblowing flow rate Dp, then, after the monitoring step b3), the stabilization step c1) is triggered up to a production cycle during which the real start of preblowing instant Ar and the real pressure peak instant Br are smaller than their respective acceptance tolerance. Then, the real gradient PRab between the real start of preblowing instant Ar and the real pressure peak instant Br is calculated for the subsequent production cycles. The real gradient PRab is for example compared to the reference pressure PCab using the device for comparing the real gradient PRab to the reference gradient PCab.

If the real gradient PRab differs from the reference gradient PCab, by a difference greater than the gradient acceptance tolerance, the following are calculated:
a new value for the nominal preblowing flow rate or a new time profile for the preblowing flow rate Dp, and/or
a new value for the pressure of the pressurized fluid source, in this case the preblowing fluid source 15, and/or
a new value for the nominal speed or the stretching time profile of the stretching rod 10.

The new preblowing nominal flow rate value or the new time profile for the preblowing flow rate Dp are for example calculated by the device for regulating the flow rate injected into the preform as a function of the result of this comparison.

The new value of the pressure of the pressurized fluid source 15 is for example calculated by the device for regulating the pressure of the pressurized fluid source 15 as a function of the result of this comparison.

The new nominal speed value or stretching time profile value of the stretching rod 10 is for example calculated by the device for regulating the nominal speed or stretching time profile of the stretching rod 10 as a function of the result of this comparison.

For example, step b1) comprises, solely or in addition, the following operations:
the real instant Ar of start of preblowing in the reference station or in another station 7, where the pressure in the preform 3 starts to increase, is detected by the pressure sensor 13 and the processor 25;
this instant Ar is stored by the memory 27;
the real end of preblowing instant is calculated by the processor 25 according to the previously defined calculation;
a real end of preblowing pressure Fr is deduced from the pressure measurements taken by the pressure sensor 13, the real end of preblowing pressure Fr determined in this manner is compared to the reference end of preblowing pressure Fc for the reference station, for example using the device for comparing the real end of preblowing pressure Fr to the reference end of preblowing pressure Fc.

If the real end of preblowing pressure Fr differs from the reference end of preblowing pressure Fc, by a value that is greater than the acceptance tolerance, a new value is calculated for the preblowing flow rate Dp, this being respectively reduced or increased with respect to the value of the preblowing flow rate Dp during the production cycle during which the real end of preblowing instant has been calculated, for example using the device for regulating the preblowing flow rate Dp injected into the preform 3 as a function of the result of this comparison, as is shown in FIG. 6.

As a function of the result of this comparison, the device for regulating the preblowing flow rate Dp injected into the preform 3 will command a change in the preblowing flow rate Dp.

According to one particular example, the machine 1 is equipped with at least a first station 7 and a second station, one of the stations is a reference station. Each station 7 is provided with a pressure sensor 13 for measuring the pressure inside the preform 3 of said station 7, and a preblowing solenoid valve 17 having a real response time between the instant TRo of commanding the opening of the preblowing solenoid valve 17 and the effective start of the increase in pressure in the preform 3.

According to this example, the regulation parameters include the start of preblowing, a predetermined response time and, in step b2), in addition to calculating a new value for the instant TRo of commanding the opening of the preblowing solenoid valve 17, the real response time is calculated. If the real response time is greater than the predetermined response time:
an alert that the reference station is drifting is issued, and/or
for a subsequent production cycle, the reference instant TRo of commanding the opening of the preblowing solenoid valve 17 of the second station is calculated, and the second station is then considered as a new reference station.

Figure 7:
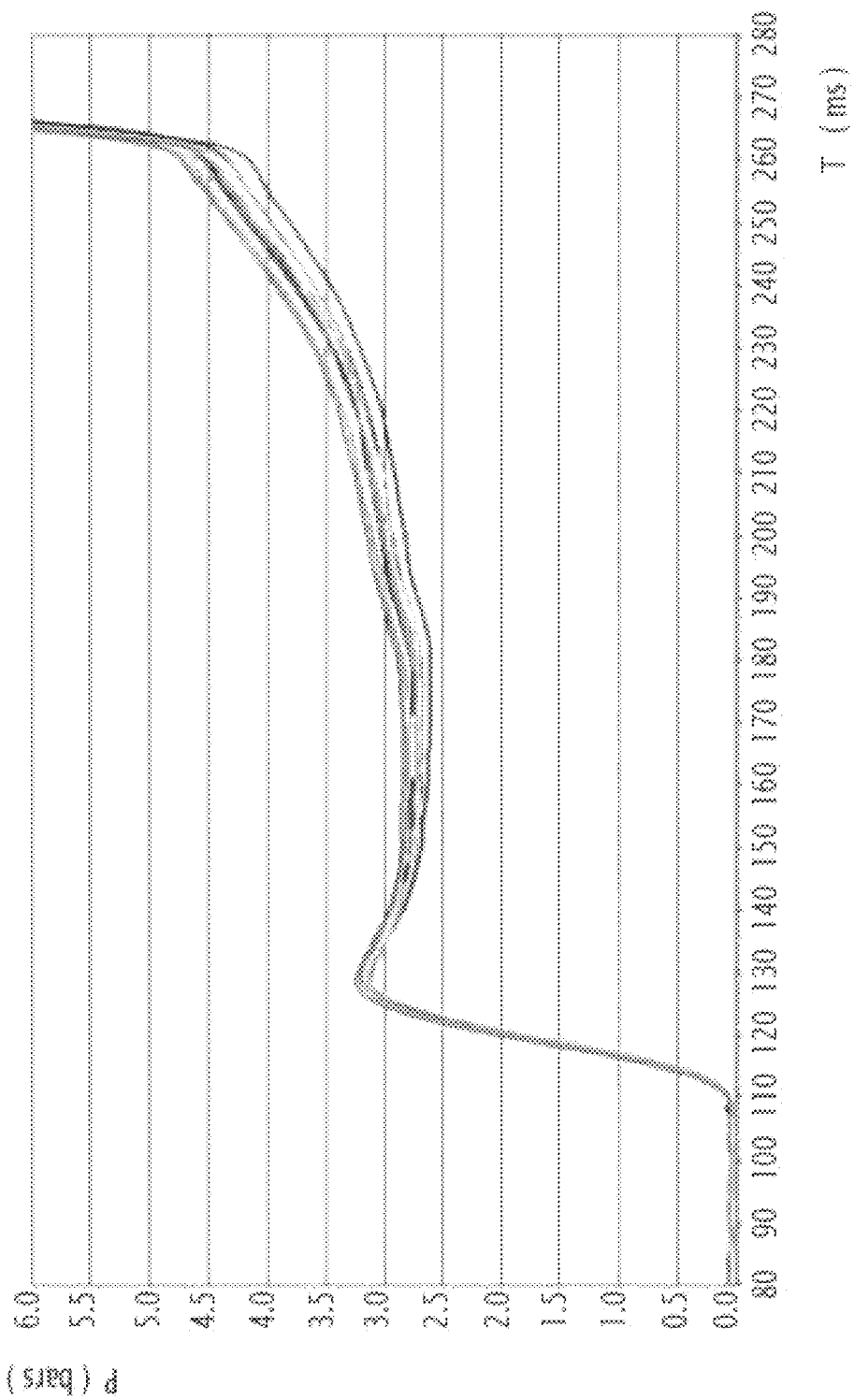
FIG. 7 is a curve illustrating the variations in pressure inside preforms of a plurality of stretch blow molding stations without regulation during preblowing.
Figure 8:
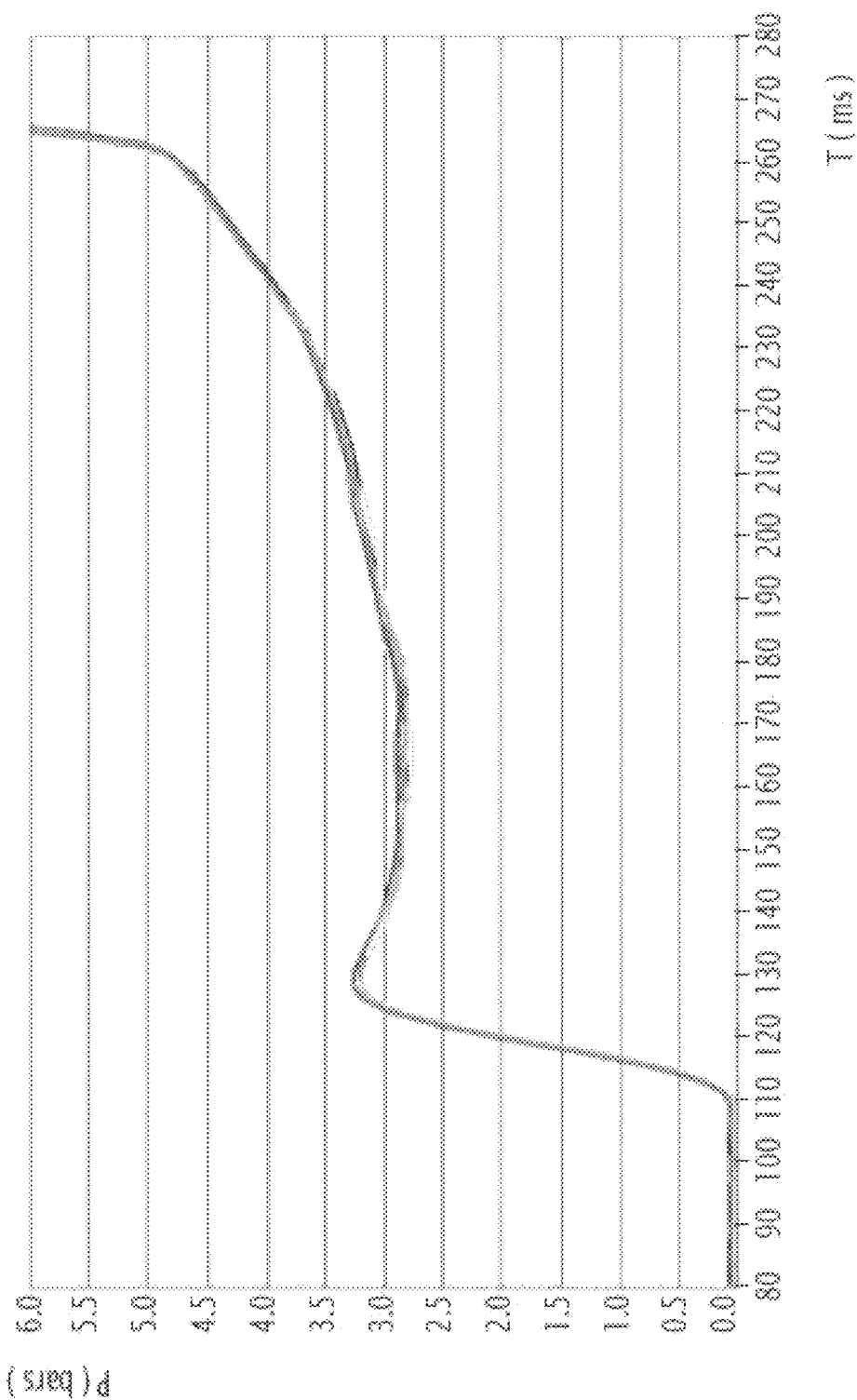
FIG. 8 is a curve illustrating the variations in pressure inside preforms of a plurality of stretch blow molding stations with regulation during preblowing.

FIG. 7 depicts a plurality of preblowing curves obtained during preblowing cycles without regulation, and FIG. 8 depicts a plurality of preblowing curves obtained during preblowing cycles with regulation according to the process according to the invention. It is clear that, with regulation, the preblowing curves are much closer to one another, which demonstrates that more regular preblowing curves are obtained, and consequently less variability in the final containers.

The regulation process according to the invention makes it possible to continue with the regulated production in the event of an imposed change in an operating parameter of the machine 1 by introducing new regulation references, without the regulation being interrupted and the need to manually implement new references.

This translates into improved productivity and better reliability of the process and the resulting products.

The present invention also relates to a computer program product designed to be implemented on the machine 1.

The computer program product comprises instructions for:
controlling the opening and the closing of the preblowing solenoid valve 17;
controlling the preblowing flow rate Dp;
taking into account the real start of preblowing instant Ar;

taking into account the reference start of preblowing instant Ac;

comparing the real start of preblowing instant Ar to the reference start of preblowing instant Ac;

regulating the instant TRo of commanding the opening of the preblowing solenoid valve 17 as a function of the result of this comparison;

detecting a change, imposed by the operator, of at least one operating parameter of the machine 1;

measuring a set of preblowing curves and storing at least the real positions Ar, Br, PRab, Fr of the characteristic points A, B, Pab, F of a set of preblowing curves, and suspending the modification of the operating parameters of the machine 1 during a predetermined stabilizing period; and instructions for updating at least one regulating parameter and once again authorizing regulated production.

Preferably, the computer program product also comprises instructions for:

taking into account the real instant Br of a peak in preblowing pressure in the preform 3;

taking into account the reference instant Bc of a peak in preblowing pressure in the preform 3;

comparing the real instant Br of a peak in preblowing pressure in the preform 3 to the reference instant Bc of a peak in preblowing pressure in the preform 3; regulating the preblowing flow rate Dp as a function of the result of this comparison;

and/or calculating a real gradient PRab between the pressure measured at the real instant Br of a peak in preblowing pressure in the preform 3 and the pressure measured at the real start of preblowing instant Ar;

calculating a reference gradient PCab between the pressure measured at the reference instant Bc of a peak in preblowing pressure in the preform 3 and the pressure measured at the reference start of preblowing instant Ac;

comparing the real gradient PRab to the reference gradient PCab;

regulating the preblowing flow rate Dp as a function of the result of this comparison and/or the pressure of the pressurized fluid source 15, and/or the nominal speed or the stretching time profile of the stretching rod 10;

and/or taking into account the real end of preblowing pressure Fr;

taking into account the reference end of preblowing pressure Fc;

comparing the real end of preblowing pressure Fr to the reference end of preblowing pressure Fc;

regulating the preblowing flow rate Dp as a function of the result of this comparison.

The invention claimed is:

1. A process for regulating a cyclical production of containers (2) by stretch blow molding from preforms (3) made of plastic material in a machine (1) comprising one or more stretch blow molding stations (7), each designed to produce a container (2) during a production cycle, and each provided with a preblowing solenoid valve (17) fluidically connecting the preform (3) to a pressurized fluid source (15) providing a preblowing flow rate (Dp) during a preblowing phase, the regulating process comprising:

a) an initializing phase comprising installing by an operator and of storing of a plurality of operating parameters of the machine (1) during the production cycle, and of regulating parameters including at least one reference position (Ac, Bc, PCab, Fc) of at least one characteristic point (A, B, Pab, F) of a preblowing curve corresponding to a pressure prevailing inside the preform (3) during at least one part of the preblowing, said reference position (Ac, Bc, PCab, Fc) being determined by a reference instant and/or a reference pressure, b) a regulated production phase comprising, for each production cycle, stretching and blowing of at least one preform (3) by injection of a pressurized fluid in each station (7) and during which:

b1) for at least one reference station of the machine (1), the preblowing curve including the characteristic point is measured and stored, and a real instant and/or a real pressure is calculated or determined, corresponding to said characteristic point (A, B, Pab, F) for the measured preblowing curve, and b2) a new value of at least one operating parameter of the machine (1) is calculated and stored as a function of a difference between the real instant and the reference instant and/or between the real pressure and the reference pressure, wherein, in this regulating process, the regulated production phase includes a step b3) of monitoring a possible change, imposed by the operator, of a value of an operating parameter of the machine (1), the regulating process further comprising a phase of automatically updating the regulating parameter(s), which is implemented in the event of an imposed change of an operating parameter of the machine (1), involving:

c1) continuing, during a stabilizing step, the production according the parameter imposed during a predetermined stabilizing period, and for each production cycle the actions b1) are executed, and the actions b2) are suspended, and c2) correcting the reference instant and/or the reference pressure as a function of the real pressure and/or real instant values stored during the stabilizing step, in order to continue with the regulated production phase.

2. The process as claimed claim 1, wherein the operating parameters of the machine (1) that can be recalculated during the step b2) are among: an instant (TRo) of commanding the preblowing solenoid valve (17) to be opened, a value or a time profile of the preblowing flow rate (Dp), a preblowing pressure or a time profile of a travel of a stretching rod (10).

3. The process as claimed in claim 1, wherein the regulating parameters include storing at least one tolerance for accepting a real position (Ar, Br, PRab, Fr) of the at least one characteristic point (A, B, Pab, F) of the preblowing curve chosen relative to the reference position of said characteristic point (A, B, Pab, F), and in which there is no calculation of a new value for said operating parameter of the machine (1) if said difference is smaller than the acceptance tolerance.

4. The process as claimed in claim 3, wherein the regulating parameters comprise a reference instant (Ac) for starting the increase in pressure inside the preform (3), termed start of preblowing reference instant (Ac), and a tolerance for the start of preblowing reference instant (Ac), and in which, if the real instant (Ar) of the start of the preblowing in the preform (3) of the reference station (7) is either later or earlier, by a time difference with respect to the start of preblowing reference instant (Ac) for said reference station that is greater than the acceptance tolerance, the new value calculated as the instant (TRo) of commanding the opening of the preblowing solenoid valve (17) of each of the stretch blow molding stations (7) is then brought forward or respectively delayed, by said time difference, in all of the stretch blow molding stations (7).

5. The process as claimed in claim 4, wherein the regulating parameters further comprising:
a reference instant (Bc) of a peak in preblowing pressure in the preform (3), and an acceptance tolerance for the reference pressure peak instant (Bc), in which the regulated production phase b) first comprises a possible imposed change in the instant (TRo) of commanding the opening of the preblowing solenoid valve (17) to a production cycle during which the real instant (Ar) of the start of the preblowing in the preform (3) is smaller than the start of preblowing acceptance tolerance,
a real instant (Br) of a pressure peak is calculated for the following production cycles, and if this is either earlier or later than the reference pressure peak instant (Bc), by a time difference that is greater than the acceptance tolerance, a new value is calculated for the preblowing flow rate (Dp), this being respectively reduced or increased with respect to the preblowing flow rate (Dp) during the production cycle during which the real pressure peak instant (Br) has been calculated.

6. The process as claimed in claim 5, wherein:
the regulating parameters further include a reference gradient (PCab) of an increase in pressure between the characteristic point (A) of the start of preblowing and the characteristic point (B) of the pressure peak, and an acceptance tolerance for said reference pressure increase gradient (PCab),
in which the regulated production phase first comprises the possible imposed change in the instant (TRo) of commanding the opening of the preblowing solenoid valve (17) to a production cycle during which the real instant (Ar) of the start of the preblowing in the preform (3) is smaller than the start of preblowing acceptance tolerance, then the possible imposed change in the preblowing flow rate (Dp) to a production cycle during which the real start of preblowing instant (Ar) and the real pressure peak instant (Br) are smaller than their respective acceptance tolerance,
then a real gradient (PRab) of the increase in pressure between the real start of preblowing instant (Ar) and the real pressure peak instant (Br) is calculated for the following production cycles, and if the real gradient (PRab) differs from the reference gradient (PCab) by a difference greater than the gradient acceptance tolerance, at least one of the following is calculated:
a new value for the nominal preblowing flow rate or a new time profile for the preblowing flow rate;
a new value for the pressure of the pressurized fluid source (15); and,
a new value for the nominal speed or the stretching time profile of a stretching rod (10).

7. The process as claimed in claim 1, wherein step b1) comprises, solely or in addition, the operations consisting in:
detecting an instant (Ar), termed real instant (Ar) of start of preblowing in the reference station or in another station (7), where the pressure in the preform (3) starts to increase;
storing this instant;
calculating a real end of preblowing instant such that:
real end of preblowing instant = real start of preblowing instant +Δt−δ,
where Δt is a predefined period of opening of the preblowing solenoid valve (17), δ is a predetermined constant;
deducing therefrom a real end of preblowing pressure (Fr) on the basis of pressure measurements taken in step b1);
comparing the real end of preblowing pressure (Fr) determined in this manner with a reference end of preblowing pressure (Fc) for the reference station;
if the real end of preblowing pressure (Fr) differs from the reference end of preblowing pressure (Fc) by a value greater than an acceptance tolerance, a new value is calculated for the preblowing flow rate (Dp), this being respectively reduced or increased with respect to the preblowing flow rate (Dp) during the production cycle during which the real end of preblowing pressure (Fr) has been calculated.

8. The process as claimed in claim 1, wherein the regulating parameters include storing at least one regulating limit for at least one of the operating parameters of the machine (1), termed monitored parameter, the actions b2) of the regulated production step further include comparing the new calculated value for a monitored parameter to the regulating limit, in the event that this limit is exceeded, a breakdown in regulation alert is issued and the regulated production is continued from a new value of the monitored parameter, among: the value during the preceding production cycle, the value entered in the initializing phase, or a combination of said values.

9. The process as claimed in claim 1, wherein the process is implemented using a machine (1) equipped with a first station (7) and a second station, one of the stations being a reference station, each station (7) being provided with a pressure sensor (13) for measuring the pressure inside the preform (3) of said station (7) and with a preblowing solenoid valve (17) having a response time between an instant (TRo) of commanding the opening of the solenoid valve (17) and the effective start of the increase in pressure in the preform (3), in which process the regulating parameters comprise the start of the preblowing, and a predetermined response time, and in which in addition to a new value for the instant (TRo) of commanding the opening of the preblowing solenoid valve (17), a real response time is calculated,
if the real response time is greater than the predetermined response time:
an alert that the reference station is drifting is issued, and/or
for a subsequent production cycle, the reference instant of opening of the solenoid valve (17) of the second station is calculated, the second station then being considered as a new reference station.

10. A process for regulating a cyclical production of containers (2) by stretch blow molding from preforms (3) made of plastic material in a machine (1) comprising one or more stretch blow molding stations (7), each designed to produce a container (2) during a production cycle, and each provided with a preblowing solenoid valve (17) fluidically connecting the preform (3) to a pressurized fluid source (15) providing a preblowing flow rate (Dp) during a preblowing phase, the regulating process comprising:
a) an initializing phase comprising installing by an operator and of storing of a plurality of operating parameters of the machine (1) during the production cycle, and of regulating parameters including at least one reference template (Ac, Bc, PCab, Fc) of at least one characteristic region (A, B, Pab, F) of a preblowing curve corresponding to a pressure prevailing inside the preform (3) during at least one part of the preblowing, said reference template (Ac, Bc, PCab, Fc) being determined by a reference time interval and/or a reference pressure interval, and/or a reference curve portion;

b) a regulated production phase comprising, for each production cycle, stretching and blowing of at least one preform (3) by injection of a pressurized fluid in each station and during which:

b1) for at least one reference station of the machine (1), the preblowing curve including the characteristic region is measured and stored, and a real portion of the preblowing curve is calculated or determined, corresponding to said characteristic region (A, B, Pab, F) for the measured preblowing curve, and b2) a new value of at least one operating parameter of the machine (1) is calculated and stored as a function of a difference between the real portion of the curve and said reference template, wherein, in this regulating process, the regulated production phase includes a step b3) of monitoring a possible change, imposed by the operator, of a value of an operating parameter of the machine (1), the regulating process further comprising a phase of automatically updating the regulating parameter(s), which is implemented in the event of an imposed change of an operating parameter of the machine (1), involving:

c1) continuing, during a stabilizing step, the production according the parameter imposed during a predetermined stabilizing period, and for each production cycle the actions b1) are executed, and the actions b2) are suspended, and c2) correcting the reference template as a function of the real portion stored during the stabilizing step, in order to continue with the regulated production phase.

11. A machine (1) for cyclical production by stretch blow molding using preforms (3) made of plastic material, which comprises: a fluid source (15) at a preblowing pressure, one or more stretch blow molding stations (7), each station (7) comprising a mold (8) having a cavity (9) that is intended to receive a preform (3); a solenoid valve (17) that is able to establish a connection between the interior of the preform (3) received in the cavity (9) and said fluid source (15) with a predetermined preblowing flow rate (Dp); a device for commanding the solenoid valve (17) to be opened and closed; a sensor (13) that is able to measure the pressure inside the preform (3); a device for detecting an instant, termed real start of preblowing instant (Ar), at which the pressure in the preform (3) begins to increase; a device for comparing this real instant (Ar) to a reference start of preblowing instant (Ac); a device for regulating an instant (TRo) of commanding the opening of the preblowing solenoid valve (17) as a function of the result of this comparison, wherein the machine comprises a device for monitoring a possible change, imposed by the operator, to an operating parameter of the machine (1), an analysis device for analyzing a succession of time curves of the pressure inside the preform (3) during a stabilizing phase without regulation, and a device for updating at least one regulation reference, these being connected to the analysis device.

12. The machine (1) as claimed in claim 11, further comprising a controllable device that is able to vary the flow rate of pressurized fluid, or a controllable variable-flow rate solenoid valve (17); a device for detecting an instant at which the pressure in the preform (3) reaches a peak, termed real preblowing pressure peak instant (Br); a device for comparing this real pressure peak instant (Br) to a reference pressure peak instant (Bc); a device for regulating the flow rate injected into the preform (3) as a function of the result of this comparison.

13. The machine (1) as claimed in claim 12, further comprising a device for calculating a real gradient (PRab) of the increase in pressure between the pressure measured at the real start of preblowing instant (Ar) and the pressure measured at the real pressure peak instant (Br); a device for comparing this real gradient (PRab) to a reference gradient (PCab); and at least one device selected from a device for regulating the preblowing flow rate (Dp) injected into the preform (3) as a function of the result of this comparison, a device for regulating the pressure of the pressurized fluid source (15) as a function of the result of this comparison, and a device for regulating the nominal speed or the stretching time profile of a stretching rod (10) as a function of the result of this comparison.

14. The machine (1) according to claim 13, further comprising a device for detecting an instant, termed real end of preblowing instant, at which the pressure in the preform (3) once again begins to increase; a device for comparing the real end of preblowing pressure (Fr) measured at this instant with a reference end of preblowing pressure (Fc); a device for regulating the preblowing flow rate (Dp) injected into the preform (3) as a function of the result of this comparison.

15. A machine (1) for cyclical production by stretch blow molding using preforms (3) made of plastic material, which comprises: a fluid source (15) at a preblowing pressure, one or more stretch blow molding stations (7), each station (7) comprising a mold (8) having a cavity (9) that is intended to receive a preform (3); a solenoid valve (17) that is able to establish a connection between the interior of the preform (3) received in the cavity (9) and said fluid source (15) with a predetermined preblowing flow rate (Dp); a device for commanding the opening and closing of the solenoid valve (17); a sensor (13) that is able to measure the pressure inside the preform (3); a device for detecting a real portion of a preblowing curve corresponding to a predetermined characteristic region; a device for comparing this real curve (Ar) to a reference template (Ac) corresponding to the predetermined characteristic region; a device for regulating an instant (TRo) of commanding the opening of the solenoid valve (17) as a function of the result of this comparison, wherein the machine (1) comprises a device for monitoring a possible change, imposed by the operator, to an operating parameter of the machine (1), a device for analyzing a succession of time curves of the pressure inside the preform (3) during a stabilizing phase without regulation, and a device for updating, these being connected to the analysis device, the device for updating being designed to update the reference template.

16. A computer-implemented method configured to be implemented on a machine (1) for manufacturing containers (2) as claimed in claim 11, the method comprising providing instructions for commanding opening and closing of the preblowing solenoid valve (17); commanding the preblowing flow rate (Dp); taking into account the real start of preblowing instant (Ar); taking into account the reference start of preblowing instant (Ac);

comparing the real start of preblowing instant (Ar) to the reference start of preblowing instant (Ac); regulating the instant (TRo) of commanding the opening of the solenoid valve (17) as a function of the result of this comparison, wherein it comprises instructions for detecting at least one change, imposed by the operator, of an operating parameter of the machine (1);

Providing instructions for measuring a set of preblowing curves and storing at least the real positions of the characteristic points of a set of preblowing curves, and suspending the modification of the operating parameters of the machine (1) during a predetermined stabilizing period, and Providing instructions for updating at least one regulating parameter and once again authorizing regulated production.

17. The computer-implemented method according to claim 16, further comprising providing instructions for taking into account a real preblowing pressure peak instant (Br) in the preform (3); taking into account a reference preblowing pressure peak instant (Bc) in the preform (3); comparing the real preblowing pressure peak instant (Br) in the preform (3) to the reference preblowing pressure peak instant (Bc) in the preform (3); and regulating the preblowing flow rate (Dp) as a function of the result of this comparison.

18. The computer-implemented method according to claim 16, further comprising calculating a real gradient (PRab) between the pressure measured at the real instant (Ar) of the start of the preblowing in the preform (3) and the pressure measured at the real preblowing pressure peak instant (Br); calculating a reference gradient (PCab) between the pressure measured at the reference instant (Ac) of the start of the preblowing in the preform (3) and the pressure measured at the reference preblowing pressure peak instant (Be); comparing the real gradient (PRab) to the reference gradient (PCab); regulating the preblowing flow rate (Dp) as a function of the result of this comparison and/or the pressure of the pressurized fluid source (15), and/or the nominal speed or the stretching time profile of the stretching rod (10).

19. The computer-implemented method according to claim 16, further comprising taking into account a real end of preblowing pressure (Fr); taking into account a reference end of preblowing pressure (Fe); comparing the real end of preblowing pressure (Fr) to the reference end of preblowing pressure (Fe); regulating the preblowing flow rate (Dp) as a function of the result of this comparison.

* * * * *